(12) United States Patent
Wang et al.

(10) Patent No.: US 9,996,289 B2
(45) Date of Patent: Jun. 12, 2018

(54) ASSIGNING LOCK RESOURCES TO OBJECTS

(71) Applicant: EMC Corporation, Hopkinton, MA (US)

(72) Inventors: Walter Lei Wang, Shanghai (CN); Matt Zhu Zhang, Shanghai (CN); Gang Cao, Shanghai (CN); Ren Ren, Shanghai (CN); Xiangqing Yang, Shanghai (CN)

(73) Assignee: EMC IP HOLING COMPANY LLC, Hopkinton, MA (US)

( * ) Notice: Subject to any disclaimer, the term of this patent is extended or adjusted under 35 U.S.C. 154(b) by 186 days.

(21) Appl. No.: 14/884,501

(22) Filed: Oct. 15, 2015

(65) Prior Publication Data

US 2016/0110129 A1    Apr. 21, 2016

(30) Foreign Application Priority Data

Oct. 21, 2014   (CN) .......................... 2014 1 0573345

(51) Int. Cl.
*G06F 3/06*         (2006.01)
*G06F 17/30*        (2006.01)

(52) U.S. Cl.
CPC .......... *G06F 3/0622* (2013.01); *G06F 3/0659* (2013.01); *G06F 3/0689* (2013.01); *G06F 17/30171* (2013.01)

(58) Field of Classification Search
None
See application file for complete search history.

(56) References Cited

U.S. PATENT DOCUMENTS

2011/0225587 A1\* 9/2011 Mealey .................... G06F 9/52
                                                           718/102

\* cited by examiner

*Primary Examiner* — Tracy Chan
(74) *Attorney, Agent, or Firm* — Krishnendu Gupta; Konrad Lee; Anne-Marie Dinius

(57) ABSTRACT

Embodiments of the present disclosure provide a method and apparatus for assigning lock resources to objects by obtaining a first alternative lock for the object, and determining first correlations between the object and each of one or more other objects when the first alternative lock has been assigned to the one or more other objects, wherein in response to determining that each of the first correlations is lower than a predetermined threshold, assign the first alternative lock to the object, and may maximize the possibility of parallel execution and reduce the time waiting for lock resources, thereby avoiding lock contention.

6 Claims, 8 Drawing Sheets

ASSIGNING LOCK RESOURCES TO OBJECTS

RELATED APPLICATION

This application claims priority from Chinese Patent Application Number CN201410573345.6 filed on Oct. 21, 2014 entitled "METHOD AND APPARATUS FOR ASSIGNING LOCK RESOURCE FOR OBJECTS" the content and teachings of which is herein incorporated by reference in its entirety.

FIELD OF THE INVENTION

Embodiments of the present disclosure relate to the field of a storage system.

BACKGROUND OF THE INVENTION

Generally, in modern computer systems, some critical resources may always be in shortage as the system becomes more and more complicated. Typically, different executing components may need to race for these resources and block other components from executing. Such contention may greatly affect overall parallel execution and system throughput. For example, in a storage system, lock resources may be utilized to ensure atomic data change. However, because of time cost and memory overheads of a plurality of locks may be very large and their hardware resource utilizations may also very expensive, the number of locks may usually be limited, which may not suffice to separately assign a lock for each object applying for lock resources.

A traditional solution may employ a Hash algorithm or an evenly distributed algorithm to assign the same lock to a plurality of objects for use, i.e., the same lock may be shared by a plurality of objects. However, the plurality of objects sharing the same lock might not be completely independent, but may be correlated with each other. In some cases, a plurality of objects with correlation may highly affect each other, and may cause deterioration of the performance of lock contention. For example, due to their correlation, a plurality of objects with correlations may always need to perform some operations simultaneously. Such operations may cause the plurality of objects to contend for the shared lock, which may cause a plurality of serialized operations, thereby affecting system performance.

SUMMARY OF THE INVENTION

Embodiments of the present disclosure relate to the field of a storage system, and more specifically, to methods and apparatuses for assigning lock resources to objects. According to an embodiment of the present disclosure, a system, a computer program product and a method for assigning a lock resource to an object is provided. In one embodiment, the method may include obtaining a first alternative lock for an object. In a further embodiment, the method may include determining first correlations between the object and each of one or more other objects when the first alternative lock may have been assigned to the one or more other objects. In a further embodiment, the method may include in response to determining that each of the first correlations may be lower than a predetermined threshold, assigning the first alternative lock to the object. According to a further embodiment of the present disclosure, the lock resources may be assigned to objects in consideration of the correlations between objects, which may maximize the possibility of parallel execution and may reduce the time waiting for lock resources, thereby avoiding lock contention.

BRIEF DESCRIPTION OF THE ACCOMPANYING DRAWINGS

Through more detailed description of the exemplary embodiments of the present disclosure in conjunction with the accompanying drawings, the above and other objects, features, and advantages of the present disclosure will become more apparent, wherein in the exemplary embodiments of the present disclosure, the same reference numerals usually represent the same components.

DETAILED DESCRIPTION

Figure 1:
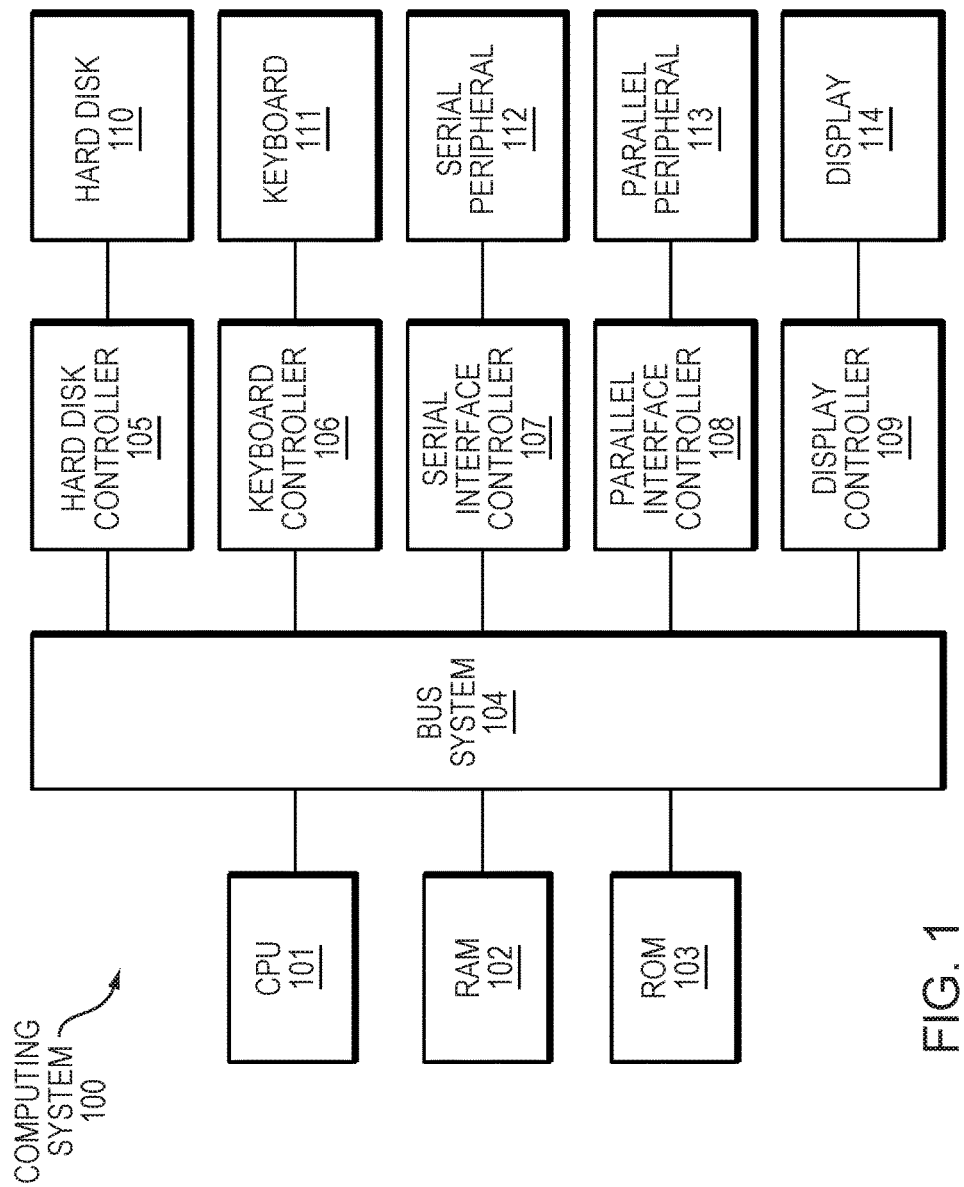
FIG. 1 shows a block diagram of an exemplary computing system 100 adapted to implement the embodiments of the present disclosure.

Hereinafter, embodiments of the present disclosure will be described in more detail with reference to the accompanying drawings. Although the accompanying drawings show the preferred embodiments of the present disclosure, it should be understood that the present disclosure may be implemented in various forms rather than being limited by the embodiments illustrated herein. On the contrary, providing these embodiments is to make the present disclosure more thorough and complete, thereby conveying the scope of the present disclosure completely to those skilled in the art.

Embodiments of the present disclosure relate to the field of a storage system, and more specifically, to methods and apparatuses for assigning lock resources to objects. According to an embodiment of the present disclosure, a system, a computer program product and a method for assigning a lock resource to an object is provided. In one embodiment, the method may include obtaining a first alternative lock for an object. In a further embodiment, the method may include determining first correlations between an object and each of one or more objects when a first alternative lock may have been assigned to one or more objects. In a further embodiment, the method may include in response to determining that each first correlations may be lower than a predetermined threshold, assigning a first alternative lock to an object. According to a further embodiment of the present disclosure, lock resources may be assigned to objects in consideration of the correlations between objects, which may maximize a possibility of parallel execution and may reduce a time waiting for lock resources, thereby avoiding lock contention.

In a further embodiment, in response to determining that each first correlation may be higher than a predetermined threshold, a second alternative lock may be obtained for an object. In a further embodiment, second correlations may be determined between an object and each of one or more other objects when a second alternative lock may not be assigned to the one or more other objects. In a further embodiment, in response to determining that each second correlation may be lower than a predetermined threshold, a second alternative lock to an object may be assigned.

In a further embodiment, in response to determining that each second correlation may be higher than a predetermined threshold, calculating a statistic value of all of first correlations as a correlation statistic value for a first alternative lock, and calculating a statistic value of all of second correlations as a correlation statistic value for a second alternative lock. A further embodiment may include causing an alternative lock for a larger one of a correlation statistic values not to be assigned to an object.

A further embodiment may include assigning a second alternative lock to an object when a second alternative lock may not be assigned. A further embodiment may include assigning a first alternative lock to an object when the first alternative lock may not be assigned. A further embodiment may include a correlation between two objects that may be determined based on whether the two objects may belong to one or more from a group consisting of: a same clone group, a same RAID group, a same resource pool, and a same deduplication domain. A further embodiment may include storing information of a lock resource assigned to an object In one embodiment, a system, a computer program product and a method for assigning lock resources to a plurality of objects may be provided. A further embodiment may include receiving a request for lock resources from a plurality of objects. A further embodiment may include assigning lock resources to each of a plurality of objects based on correlations between a plurality of objects. A further embodiment may include, assigning lock resources to each of a plurality of objects based on correlations between the plurality of objects. A further embodiment may include avoid assigning a same lock resource to the two objects when it may be determined that in response to a correlation between two objects in a plurality of objects that may be greater than a first threshold.

A further embodiment may include assigning a same lock resource to two objects when it may be determined that in response to a correlation between two objects in a plurality of objects may be lower than a second threshold. In a further embodiment, a correlation between two objects may be determined based on whether two objects may belong to one or more of the following from the group consisting of: a same clone group, a same RAID group, a same resource pool, and a same deduplication domain.

In one embodiment, an apparatus for assigning a lock resource to an object may be provided. In a further embodiment, the apparatus may include a obtaining unit, a determining unit, a assigning unit and a storing unit. In a further embodiment, an obtaining unit may be configured to obtain a first alternative lock for an object. In a further embodiment, a determining unit may be configured to determine first correlations between an object and each of one or more other objects when a first alternative lock may have been assigned to the one or more other objects. In a further embodiment, an assigning unit may be configured to, in response to determining that each of the first correlations may be lower than a predetermined threshold, assign a first alternative lock to an object.

In a further embodiment, the assigning unit may be further configured to obtain a second alternative lock for an object in response to determining that any of the first correlations may be higher than a predetermined threshold. In a further embodiment, the assigning unit may be further configured to determine second correlations between an object and each of one or more other objects when a second alternative lock may have been assigned to the one or more other objects. In a further embodiment, the assigning unit may be further configured to assign a second alternative lock to an object, in response to determining that each of the second correlations may be lower than the predetermined threshold.

In a further embodiment, the assigning unit may be further configured to calculate a statistic value of all of the first correlations as a correlation statistic value for a first alternative lock, in response to determining that each of the second correlations may be higher than the predetermined threshold. In a further embodiment, the assigning unit may be further configured to calculate a statistic value of all of the second correlations as a correlation statistic value for a second alternative lock. In a further embodiment, the assigning unit may be further configured to cause an alternative lock for a larger one of the correlation statistic values not to be assigned to an object.

In a further embodiment, the assigning unit may be further configured to assign a second alternative lock to an object when the second alternative lock is not assigned. In a further embodiment, the assigning unit may be further configured to assign a first alternative lock to an object when the first alternative lock is not assigned.

In a further embodiment, a correlation between two objects may be determined based on whether the two objects may belong to one or more of the following from a group consisting of: a same clone group, a same RAID group, a same resource pool, and a same deduplication domain. In a further embodiment, a storing unit may be configured to store information of the lock resource assigned to the object.

In one embodiment, an apparatus for assigning lock resources to a plurality of objects may be provided. In a further embodiment, the apparatus may include a receiving unit and an assigning unit. In a further embodiment, a receiving unit may be to receive a request for lock resources from a plurality of objects. In a further embodiment, an assigning unit may be configured to assign lock resources to each of a plurality of objects that may be based on correlations between a plurality of objects.

In a further embodiment, the assigning unit may be further configured to avoid assigning a same lock resource to two objects in response to a correlation between two objects in a plurality of objects that may be greater than a first threshold. In a further embodiment, the assigning unit may be further configured to assign a same lock resource to two objects in response to a correlation between two objects in a plurality of objects that may be lower than a second threshold. In a further embodiment, a correlation between two objects may be determined that may be based on whether two objects may belong to one or more of the following consisting from a group of: a same clone group, a same RAID group, a same resource pool, and a same deduplication domain.

In one embodiment, the lock resources may be assigned to objects in consideration of a correlation between objects, which may maximize a possibility of parallel execution and reduce a time waiting for lock resources, thereby avoiding lock contention.

FIG. 1 illustrates a block diagram of an exemplary computing system 100 adapted to implement the embodiments of the present disclosure. As illustrated in FIG. 1, the computing system 100 includes CPU (Central Processing Unit) 101, RAM (Random Access Memory) 102, ROM (Read Only Memory) 103, system bus 104, hard disk controller 105, keyboard controller 106, serial interface controller 107, parallel interface controller 108, display controller 109, hard disk 110, keyboard 111, serial peripheral 112, parallel peripheral 113 and touch screen display 114. Among these components, system bus 104 is connected to CPU 101, RAM 102, ROM 103, hard disk controller 105, keyboard controller 106, serial interface controller 107, parallel controller 108 and display controller 109. Hard disk 110 is connected to hard disk controller 105; keyboard 111 is connected to keyboard controller 106; serial peripheral 112 is connected to serial interface controller 107; parallel peripheral 113 is connected to parallel interface controller 108; and touch screen display 114 is connected to display controller 109. It should be understood that the structural block diagram in FIG. 1 is only for illustration purpose, and is not intended to limit the disclosure. In some cases, some devices may be added or removed as required.

Embodiments of the present disclosure may be implemented as a system, a method, or a computer program product. In some embodiment, the present disclosure may be specifically embodied in the following forms: full hardware, full software (including firmware, residing software, microcode, etc.), or a combination of hardware and software, which is generally referred to as "a circuit," "a module," or "a system." In some further embodiments, the disclosure may be embodied as a computer program product in one or more computer-readable medium, and this computer readable medium includes computer readable code.

In some embodiment, any combination of one or more computer readable mediums may be employed. In a further embodiment, a computer readable medium may be a computer readable signal medium or a computer readable storage medium. In a further embodiment, a computer readable medium, for example, may be, but not limited to, an electric, magnetic, optical, electromagnetic, infrared, or semiconductor system, apparatus or device, or any combination of the above. In an example embodiment, a computer-readable medium (non-exhaustive list) may also include: an electrical connection having one or more wires; a portable computer disk, a hard disk, a random access memory (RAM), a read only memory (ROM), an erasable programmable read only memory (EPROM or flash disk), an optical fiber, a portable compact disc read-only memory (CD-ROM), an optical memory device, a magnetic memory device, or any appropriate combination of the above. In a further embodiment of the present disclosure, a computer readable memory medium may be any tangible medium including or storing a program. In a further embodiment, a program may be used by an instruction execution system, an apparatus, or a device or a combination therewith.

In some embodiments, a computer-readable signal medium may include data signals propagated in the baseband or as a part of carrier, which carry computer readable program codes. In a further embodiment, such propagated data signals may assume a plurality of forms, including, but not limited to, electro-magnetic signals, optical signals, or any appropriate combination of the above. In a further embodiment, a computer readable signal medium may also be any computer readable medium other than the computer readable storage medium. In a further embodiment, a computer readable medium may send, propagate or transmit a program used by or in combination with an instruction executing system, apparatus or device.

In some embodiment, a program code embodied in a computer readable medium may be transmitted using any appropriate medium, including, but not limited to, radio, wire, cable, RF, etc., or any appropriate combination of the above.

In one embodiment, a computer program code for executing operations of the present disclosure may be compiled by one or more program design languages or a combination thereof. In a further embodiment, a program design languages may include an object oriented programming language such as Java, Smalltalk, C++ or the like, and conventional procedural programming languages, such as the "C" programming language or similar programming languages. In a further embodiment, a program code may be executed entirely on a user's computer, partly on a user's computer, as a stand-alone software package, partly on a user's computer and partly on a remote computer or entirely on the remote computer or server. In a further embodiment, related to a scenario of a remote computer, a remote computer may be connected to a user's computer via any type of network, including a local area network (LAN) or a wide area network (WAN), or the connection may be made to an external computer (for example, via the Internet using an Internet Service Provider).

Hereinafter, the present disclosure will be described with reference to methods, apparatuses (systems), as well as flow diagrams and/or block diagrams of a computer product according to the embodiments of the present invention. It should be understood that each block in the flow diagrams and/or block diagrams in the present disclosure and a combination of respective blocks in the flow diagrams and/or block diagrams may be implemented by computer program instructions. In one embodiment, these computer program instructions may be provided to a processor of a general-purpose computer, a dedicated computer, or other programmable data processing apparatus, thereby producing a machine. In a further embodiment, these computer program instructions may be executed by a computer or other programmable data processing apparatus, thereby producing an apparatus for performing the functions/operations specified in the blocks of the flow diagrams and/or block diagrams.

In one embodiment, these computer readable program instructions may also be stored in a computer readable storage medium that can direct a computer or other programmable data processing apparatus to function in a particular manner. In a further embodiment, instructions stored in a computer readable medium will produce an article of manufacture including instruction means, which implement the functions/operations specified in the flow diagrams and/or blocks in the block diagrams.

In one embodiment, computer readable program instructions may also be loaded onto a computer, other programmable data processing apparatus, or other device in order to cause a series of operational steps that may be performed on the computer, other programmable apparatus or other device to produce a computer-implemented process. In a further embodiment, instructions executed on a computer, other programmable apparatus, or other device implements the functions/operations specified in the flow diagrams and/or blocks in the block diagrams.

Figure 2:
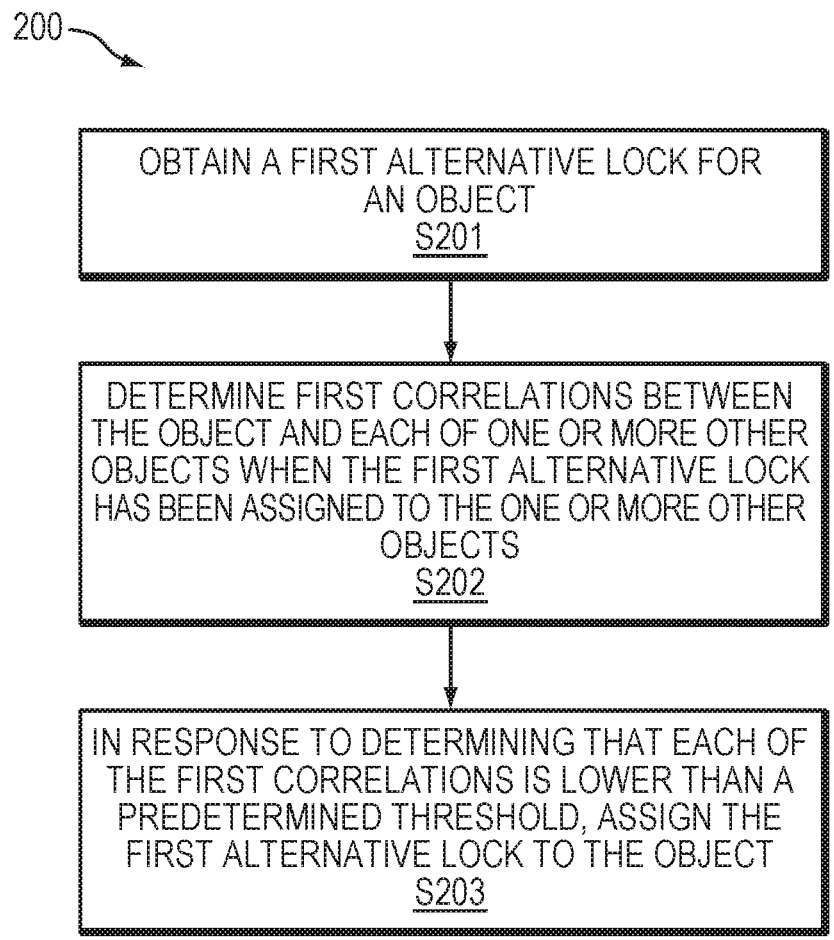
FIG. 2 shows an exemplary flow diagram of a method 200 for assigning lock resources to objects according to one aspect of the present disclosure.

FIG. 2 shows an exemplary flow diagram of a method 200 for assigning lock resources to objects according to one aspect of the present disclosure. Throughout the context of the present application, the term "object" refers to various entities applying for lock resources in a storage system. According to the method 200, in step S201, a first alternative lock for the object is obtained. In one embodiment, the "first alternative lock" herein may be one alternative lock predetermined to be assigned to the object through any existing method (e.g., Hash algorithm or evenly distributed algorithm, etc.), and embodiment of the present disclosure may not be limited in selecting a first alternative lock for an object.

Referring again to FIG. 2, the method 200 proceeds to step S202, wherein when the first alternative lock has been assigned to one or more other objects, first correlations between the object and each of the one or more objects are determined. In one embodiment, a lock (e.g., the first alternative lock in step S201) assigned according to an existing method may be shared between a plurality of objects. In a further embodiment, in order to guarantee interactions and deteriorations of performance may not be caused by existence of correlation between a plurality of objects sharing a same lock. In a further embodiment, the present disclosure considers, one by one, correlations between an object that may be currently applying for a lock resource and one or more objects to which the alternative lock may be assigned.

In one embodiment, a "correlation" between two objects may be defined as needed. In an example embodiment, when two objects belong to a same clone group, come from a same RAID group (RG), a same resource pool, or a same deduplication domain, it may be assumed that there may be a correlation between the two objects. In a further embodiment, this may be because individual objects coming from a same repository (e.g., clone group, RG, resource pool, or deduplication domain, etc.) may inherit common properties of the same repository. In a further embodiment, if a property of a common repository changes, individual objects may also adopt the same action simultaneously. In an example embodiment, for a plurality of clone objects from a same clone group, change of data stored in one clone object may also cause a same change to data stored in other clone objects so as to maintain a consistency of the clone group, which causes a strong correlation between individual objects in the same clone group. In a further embodiment, in this case, individual objects may be contend for a global lock to guarantee consistency of a change.

In a further embodiment, for a finer-granularity consideration, it may be assumed that a correlation between objects belonging to a same clone group may be higher than a correlation between objects from a same RAID group, a same resource pool, or a same deduplication domain. In a further embodiment, in order to intuitively represent correlation between objects, numerical values may be introduced to measure the correlation. In an example embodiment, correlation between objects belonging to a same clone group may be set to 1; correlation between objects from a same deduplication domain may be set to 0.75, while correlation between objects from a same RAID group or same resource pool may be set to 0.5. In an example embodiment, if no correlation between two objects may be found/established, correlation may be set to 0. Those skilled in the art should understand that the above definition of correlation and numerical measure of the correlation are only exemplary in nature, and should not be construed to be a limitation of the embodiments of the present disclosure. In an additional embodiment, it may be easily understood that in alternative cases, a first alternative lock may be assigned to an object when the first alternative lock may not have been assigned to any other objects.

Referring again to FIG. 2, next, the method 200 proceeds to step S203, where in response to determining that each of the first correlations is lower than a predetermined threshold, the first alternative lock is assigned to the object. In one embodiment, where it may be determined that each of the first correlation may be lower than the predetermined threshold, it may be assumed that there may be no correlation or a low correlation between an object and one or more objects to which a first alternative lock may be assigned. In a further embodiment, a first alternative lock may be assigned to an object. In a further embodiment, a clone group in step S202 may be considered as an example. In a further embodiment, since individual clone object belonging to a same clone group may nearly always require a change at a same time, if a same lock may be assigned to them, these clone objects may have to be changed in serial, rather than in parallel, which may greatly affect the efficiency of the system. In a further embodiment, on the contrary, if the same lock may be shared by objects without mutual correlation or with a low correlation there between, occurrence of serialized operation may be avoided as far as possible, which may enhance execution efficiency of the system. In a further embodiment, it may be noted that, a predetermined threshold in step S203 may be preset as required, e.g., set to a value 0.1. Referring again to FIG. 2, method 200 ends In one embodiment, it may be easily seen that sharing of a same lock by a plurality of objects simultaneously performing operations may be avoided through implementation of method 200. In a further embodiment, advantageously, serialized operations may be minimized and execution efficiency of a system may be enhanced.

Figure 3:
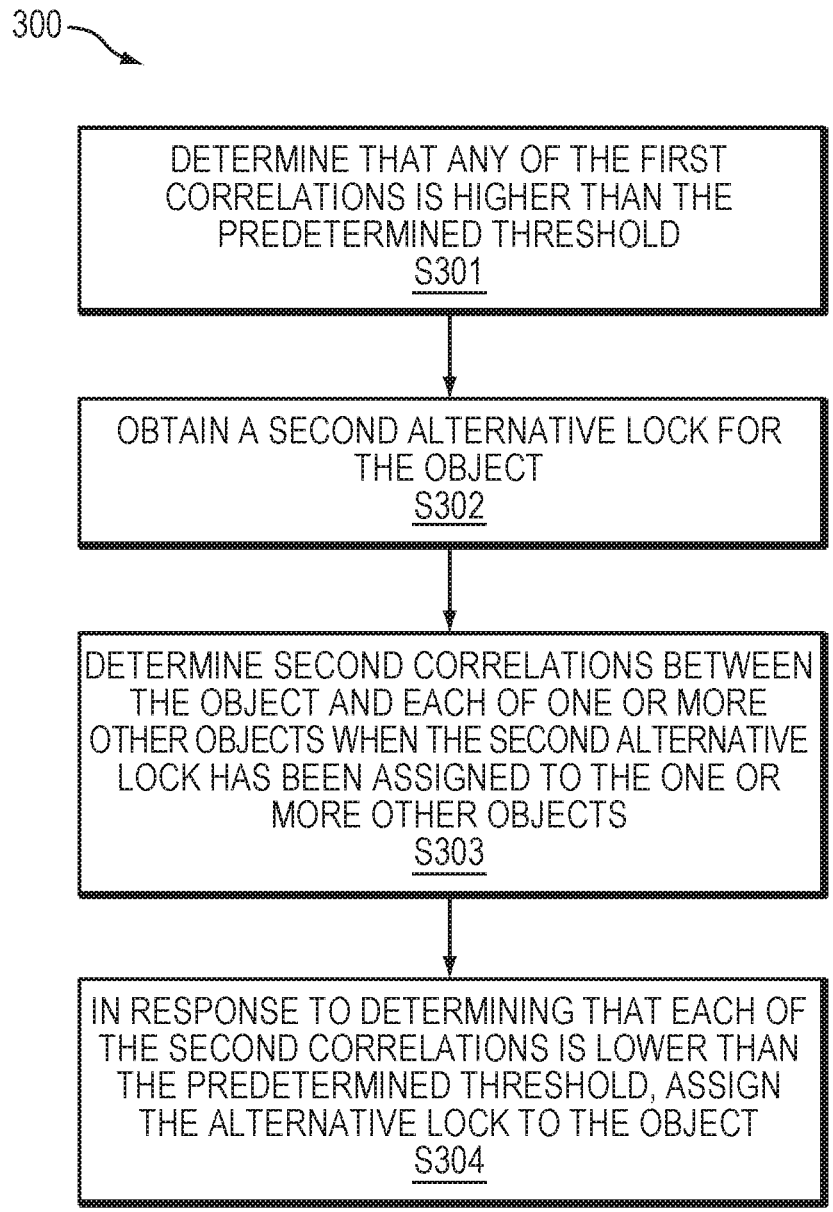
FIG. 3 shows an exemplary flow diagram of a further method 300 for assigning lock resources to objects according to an embodiment of the present disclosure.

FIG. 3 shows an exemplary flow diagram of a further method 300 for assigning lock resources to objects according to an embodiment of the present invention. According to the method 300, when it is determined in step S203 of the method 200 that any of the first correlations is higher than the predetermined threshold (step S301), a second alternative lock for the object is obtained (step S302). In one embodiment, similar to step S201, the "second alternative lock" may also be a further alternative lock predetermined to be assigned to an object through any existing method (e.g., Hash algorithm or evenly distributed algorithm, etc.). In a further embodiment, the present disclosure may not be limited in selecting a second alternative lock for an object.

Referring to FIG. 3 again, the method 300 proceeds to step S303, where when the second alternative lock has been assigned to one or more other objects, second correlations between the object and each of the one or more other objects are determined. In one embodiment, the process of determining correlations in step S303 may be similar to the process of determining correlations in step S202 of method 200, which will not be detailed here. In a further embodiment, it may also be appreciated that in optional scenarios, a second alternative lock may be assigned to an object when a second alternative lock may not have been assigned to any other objects.

Referring to FIG. 3 again, the method 300 proceeds to step S304, where in response to determining that each of the second correlations is lower than the predetermined threshold, the second alternative lock is assigned to the object. In one embodiment, implementation of step S304 may be similar to step S203 of the method 200, which will not be discussed in detail here. Referring to FIG. 3 again, method 300 ends.

In one embodiment, considering that there may be more than one alternative locks for one object, the method 300 may attempt to obtain another alternative lock when one alternative lock may have been occupied by a correlated object. In a further embodiment, may then assign the another alternative lock to an object when the another alternative lock may not have been occupied by the correlated object. In a further embodiment, this may further optimizes allocation of lock resources and enhances system efficiency.

Figure 4:
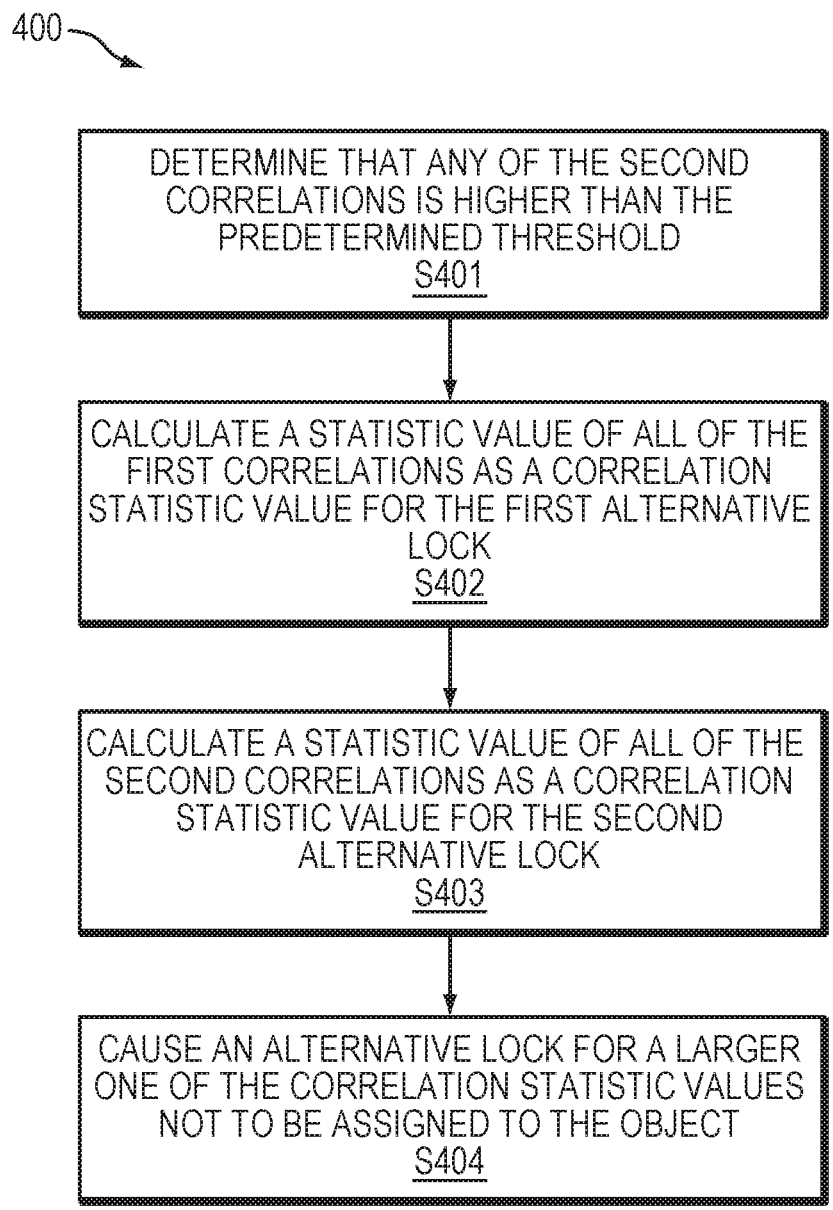
FIG. 4 shows an exemplary flow diagram of a still further method 400 for assigning lock resources to objects according to an embodiment of the present disclosure.

FIG. 4 shows an exemplary flow diagram of a method 400 for assigning a lock resource to an object according to an embodiment of the present invention. The method 400 focuses on a scenario in which it is determined in step S304 of the method 300 that any of the second correlations is higher than the predetermined threshold (step S401). In this scenario, the method 400 proceeds to step S402 to calculate a statistical value of all of first correlations as a correlation statistic value for the first alternative lock. —In an example embodiment, if R1 may be used to represent the correlation statistical value for the first alternative lock, then $R_1=\Sigma_{t=1}^{x}r_t$, wherein x represents a number of objects to which the first alternative lock may have been assigned, and $r_t$ represents the correlation between the object applying for the first alternative lock and the $t^{th}$ object in the x objects.

Referring again to FIG. 4, method 400 proceeds to step S403, to calculate a statistical (statistic) value for all the second correlations, as the correlation statistic value for the second alternative lock. In an example embodiment, if $R_2$ represents the correlation statistic value for the second alternative lock, $R_2=\Sigma_{t=1}^{x}r_t$, wherein x represents the number of objects to which the second alternative lock has been assigned, and $r_t$ represents the correlation between the object for applying for the second alternative lock and the $t^{th}$ object in the x objects.

Referring again to FIG. 4, the method 400 proceeds to step S404, such that an alternative lock to which a larger one of the correlation statistic values is applied is not assigned to the object. In an example embodiment, if the value of R1 may be greater than that of R2, it may be indicated that the total correlation of the object and the objects to which the first alternative lock is assigned may be higher than the total correlation of the object and the objects to which the second alternative lock may be assigned. In a further embodiment, compared with the second alternative lock, the first alternative lock may not be assigned to the object. In a further embodiment, in case where the object may have only two alternative locks, the second alternative lock to which R2, a smaller one of the correlation statistic values, may be applied, may be assigned to the object. In a further embodiment, there may be N (N is a positive integer) alternative locks that may be applied to the object. In a further embodiment, similarly $R_i=\Sigma_{t=1}^{x}r_t$, may be calculated, wherein i=1, 2, . . . , N, x represents the number of objects to which the $i^{th}$ alternative lock has been assigned, $r_t$ represents the correlation between the object applying for the $i^{th}$ alternative lock and the $t^{th}$ object in the x objects. In a further embodiment, an alternative lock to which the smallest R selected from $R_1, R_2, \ldots, R_N$ is applied may assigned to the object. Method 400 ends.

In one embodiment, it may be seen that when determining that a plurality of alternative locks given to one object have all been occupied by correlated objects, the method 400 may consider the total statistic value of the correlations to determine assigning of the lock resources, which may optimize resource allocation in a finer granularity and further enhances system efficiency.

In a further alternate embodiment, the information of the lock resources assigned to the objects in methods 200, 300 and 400 may be stored such that it may be automatically recovered upon the system reboots. In a further alternative embodiment, the information of the assigned lock resources may be static, unless the objects may be deleted; otherwise, no change will occur. In a further embodiment, this may facilitate saving costs for assigning lock resources. However, those skilled in the art would appreciate that the assigned lock resource information may be completely generated dynamically, and is not a limitation with respect to embodiments of the present disclosure.

Figure 5:
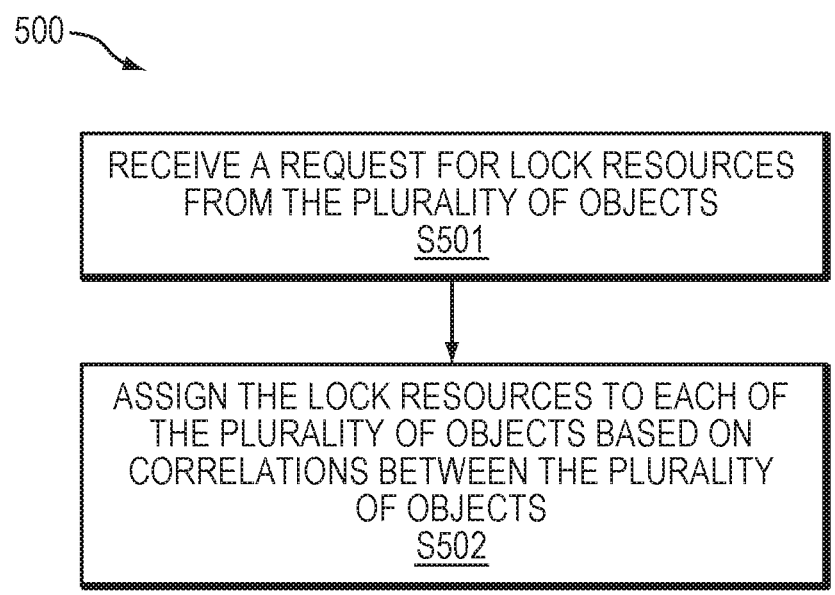
FIG. 5 shows an exemplary flow diagram of a method 500 for assigning lock resources to a plurality of objects according to another aspect of the present disclosure.

FIG. 5 shows an exemplary flow diagram of a method 500 for assigning lock resources to a plurality of objects according to another aspect of the present invention. According to method 500, in step S501, requests for lock resources are first received from a plurality of objects. Next, the method 500 proceeds to step S502, where a lock resource is assigned to each of the plurality of objects based on correlations between the plurality of objects. In one embodiment, according to a principle similar to that described with reference to FIGS. 2-4, it may be advantageous to assign lock resources to objects in consideration of the correlations between the objects. In certain embodiments, the term "correlation" in step S502 may be defined with reference to similar explanations in step S202 of the method 200 or defined according to specific applications, which is not be detailed here. In an example embodiment, two objects may be believed to be correlated when the two objects belong to a same clone group, come from a same RAID group, a same resource pool or a same deduplication domain.

In an alternative embodiment of implementing the present disclosure, step S502 may further include: avoiding assigning a same lock resource to the two objects, in response to determination that a correlation between two objects in the plurality of objects may be greater than a first threshold.

In a further alternative embodiment of implementing the present disclosure, step S502 may further include: assigning the same lock resource to the two objects, in response to determination that the correlation between two objects in the plurality of objects may be lower than the second threshold.

Those skilled in the art should understand, under the same concept as described in methods 200-400 with reference to FIGS. 2-4, the implementation of method 500 described with reference to FIG. 5 may refer to any possible steps of the above methods 200-400, which will not be detailed for the sake of brevity.

Figure 6:
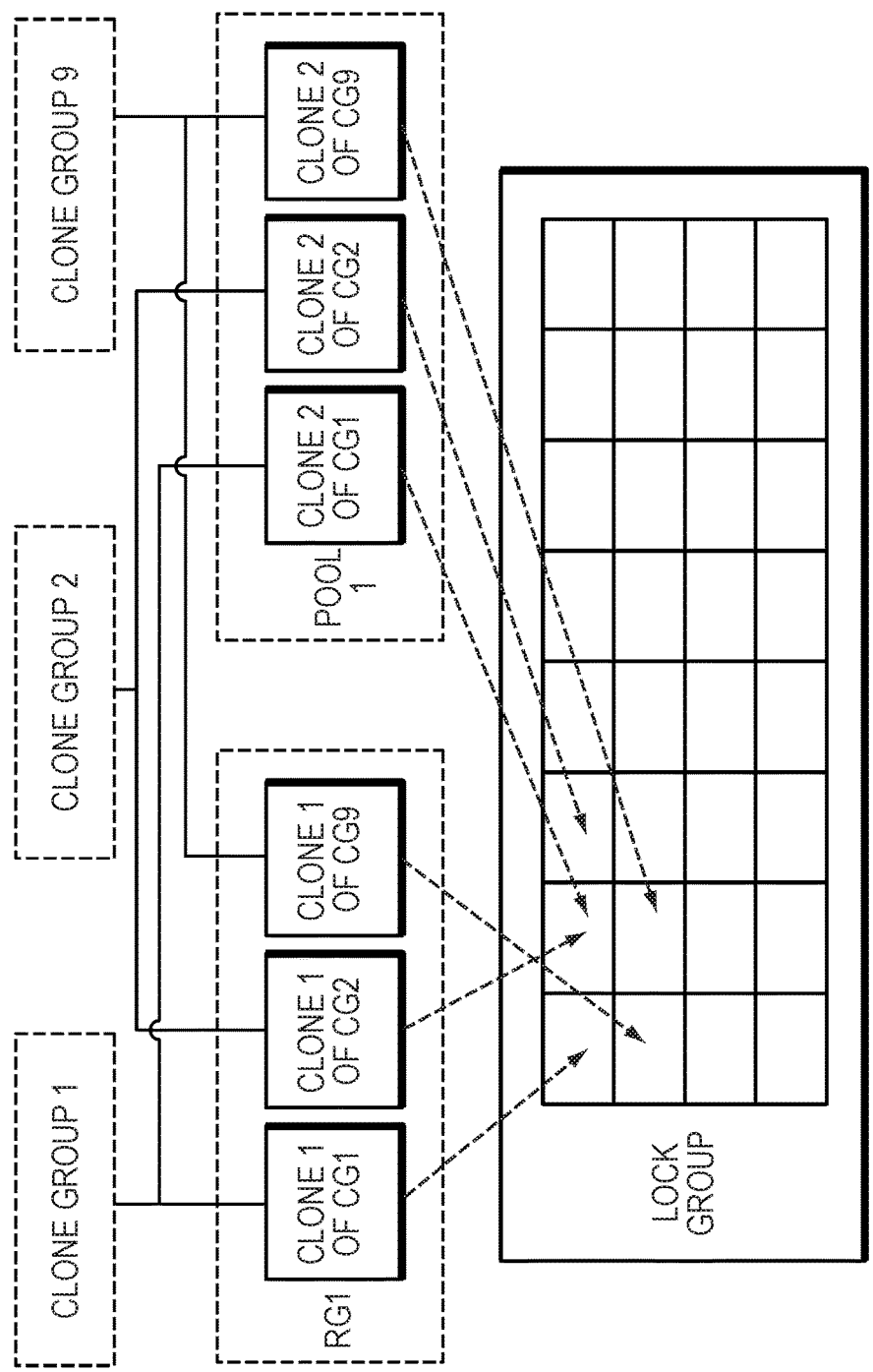
FIG. 6 shows a specific example of assigning lock resources to a plurality of objects according to the present disclosure.

FIG. 6 shows an example of assigning lock resources to a plurality of objects according to the present disclosure. As shown in the figure, a plurality of objects (clone objects in FIG. 6) only relates to three possible correlation relationships: from the same clone group, the same RAID group (RG), or the same storage pool. In practice, the correlation relations of respective objects apparently further include other scenarios, e.g., from the same deduplication domain, etc. (not shown in FIG. 6). Each clone group involved in FIG. 6 is shown to include two (2) clones. However, in an actual system, the number of clones in each clone group might be different. In some storage systems, the number of clones may up to eight (8). For example, there may be totally 32 locks in the lock group available to the plurality of clone groups (the number of locks is illustrative). In order to assign the limited lock resources to a considerable number of clone objects, the method according to the present disclosure may adopt the following steps:

In one embodiment, considering a maximum number of the objects that may require simultaneous actions in the strongest correlation relationship, a dimension m may be determined so as to convert the lock group into a m*n matrix. In an example embodiment, a strongest correlation relationship among the correlation relationships involved in FIG. 6 comes from the same clone group, while a possible maximum number of clones in the same clone group is 8, i.e., it is likely that 8 clone numbers may require performing actions simultaneously; therefore, the dimension m may be determined to 8. In a further embodiment, similarly 32 locks may be converted into an 8*4 matrix, as shown in the bottom of FIG. 6.

In one embodiment, for each clone object in each clone group, any method including a convention method may be employed to determine the alternative locks in the lock array, and lock resource assignment may be performed according to relevant steps detailed in methods 200-500. In an example embodiment, an alternative lock for the $y^{th}$ clone object in the $x^{th}$ clone group may be predetermined to be a lock in the (x+(y−1)% $m^{th}$ column in the array, wherein % represents a "modulo operation." In a further embodiment, as shown in FIG. 6, alternative locks for clone 1 of the clone group 1 may be 4 locks in the (1+(1−1))%8=$1^{st}$ column in the array. In a further embodiment, its first alternative lock may be a lock in the first column of the first row. In a further embodiment, because this lock has not been assigned yet, it may be directly assigned to clone 1 of the clone group 1. In a further embodiment, alternative locks for clone 1 of the clone group 2 are 4 locks of the (2+(1−1))%8=$2^{nd}$ column in the array. In a further embodiment, its first alternative lock may be the lock in the second column of the first row. In a further embodiment, since the lock has not been assigned, it may be directly assigned to clone 1 of the clone group 2.

In a further embodiment, similarly, alternative locks for respective clones in other clone groups may be determined. In a further embodiment, it may be noted that alternative locks for clone 2 of clone group 1 are four locks in the (1+(2-1))%8=$2^{nd}$ column in the array. In a further embodiment, its first alternative locks may be a lock in the second column of the first row. In a further embodiment, since this lock has been assigned to clone 1 of the clone group 2, it may be needed to further determine the correlation between the two clone objects. In a further embodiment, since they come from different clone groups, different RGs, and different resource pools, in this example, it may be assumed that the correlation therebetween may be very low, such that the lock in the second column of the first row may be still assigned to the clone 2 of the clone group 1. In a further embodiment, for clone 1 of clone group 9, its alternative locks may be 4 locks in the (9+(1-1)%8=$1^{st}$ column in the array. In a further embodiment, its first alternative locks may be locks in the first column of the first row. In a further embodiment, since this lock has been assigned to clone 1 of the clone group 1, and it may be further determined that the two clone objects belong to the same RG and have a considerable correlation, the second alternative lock in the first column of the second row is considered. In a further embodiment, since this lock has not been assigned to any object, this lock may be directly assigned to clone 1 of the clone group 9. In a further embodiment, if four alternative locks of clone 1 of the clone group 9 are all occupied by other objects correlated therewith, the statistical values (e.g., total sums) of the correlations of respective alternative locks may be calculated one by one, such that an alternative lock with the smallest statistic value may be assigned to the clone object.

Figure 7:
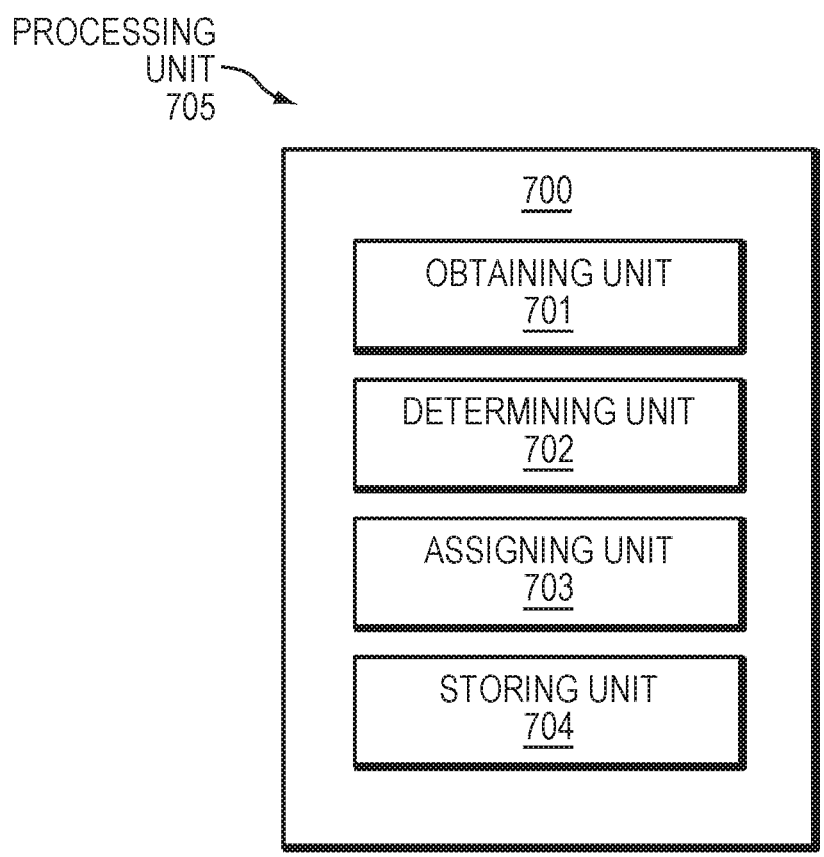
FIG. 7 shows a schematic block diagram of an apparatus 700 for assigning lock resources to objects according to an exemplary embodiment of the present invention.

Next, refer to FIG. 7, in which apparatus 700 for assigning lock resources to objects according to an exemplary embodiment of the present disclosure is further described. As shown in the figure, apparatus 700 comprises obtaining unit 701, determining unit 702, assigning unit 703 and storing unit 704. In one embodiment, a single processing unit 705 may replace all the above units. Obtaining unit 701 is configured to obtain a first alternative lock for the object. Determining unit 702 is configured to determine first correlations between the object and each of one or more other objects when the first alternative lock has been assigned to the one or more other objects. Assigning unit 703 is configured to, in response to determining that each of the first correlations is lower than a predetermined threshold, assign the first alternative lock to the object.

In an alternative embodiment of the present disclosure, assigning unit 703 may be further configured to: in response to determining that any of the first correlations may be higher than the predetermined threshold; obtain a second alternative lock for the object. In a further embodiment, assigning unit 703 may be further configured to determine second correlations between the object and each of one or more other objects when the second alternative lock has been assigned to the one or more other objects. In a further embodiment, assigning unit 703 may be further configured to: in response to determining that each of the second correlations may be lower than the predetermined threshold, assign the second alternative lock to the object.

In an alternative embodiment, assigning unit 703 may be further configured to: in response to determining that each of the second correlations is higher than the predetermined threshold; calculate a statistic value of all of the first correlations as a correlation statistic value for the first alternative lock. In a further embodiment, assigning unit 703 may be further configured to calculate a statistic value of all of the second correlations as a correlation statistic value for the second alternative lock. In a further embodiment, assigning unit 703 may be further configured to cause an alternative lock for a larger one of the correlation statistic values not to be assigned to the object.

In an alternative embodiment of the present disclosure, assigning unit 703 may be further configured to assign the second alternative lock to the object when the second alternative lock is not assigned.

In an alternative embodiment of the present disclosure, assigning unit 703 may be further configured to assign the first alternative lock to the object when the first alternative lock is not assigned.

In an alternative embodiment of the present disclosure, a correlation between two objects may be determined based on whether the two objects belong to one or more of the following: a same clone group, a same RAID group, a same resource pool, and a same deduplication domain.

In an alternative embodiment of the present disclosure, storing unit 704 may be configured to store information of the lock resource assigned to the object. In an alternate embodiment, apparatus 700 may include a single processing unit 705 that can perform the tasks associated with obtaining unit 701, determining unit 702, assigning unit 703 and storing unit 704.

Figure 8:
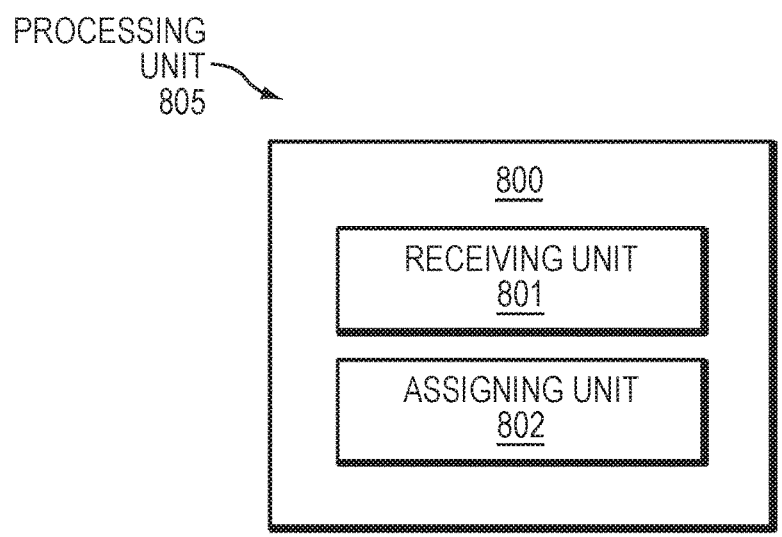
FIG. 8 shows a schematic block diagram of an apparatus 800 for assigning lock resources to objects according to an exemplary embodiment of the present invention.

An apparatus 800 for assigning lock resources to a plurality of objects according to the exemplary embodiments of the present disclosure is further described with reference to FIG. 8. As shown in the FIG. 8, apparatus 800 comprises receiving unit 801 and assigning unit 802, wherein receiving unit 801 is configured to receive a request for lock resources from the plurality of objects. Assigning unit 802 is configured to assign the lock resources to each of the plurality of objects based on correlations between the plurality of objects. In an alternate embodiment, apparatus 800 may include a single processing unit 805 that can perform the tasks associated with receiving unit 801 and assigning unit 802.

In an alternative embodiment of the present disclosure, assigning unit 802 may be further configured to: in response to a correlation between two objects in the plurality of objects is greater than a first threshold, avoid assigning a same lock resource to the two objects.

In an alternative embodiment of the present disclosure, assigning unit 802 may be further configured to: in response to a correlation between two objects in the plurality of objects is lower than a second threshold, assign a same lock resource to the two objects.

In an alternative embodiment of the present disclosure, a correlation between two objects may be determined based on whether the two objects belong to one or more of the following: a same clone group, a same RAID group, a same resource pool, and a same deduplication domain.

The flow diagrams and block diagrams in the figures illustrate the architecture, functionality, and operation of possible implementations of systems, methods and computer program products according to various embodiments of the present disclosure. In this regard, each block in the flow diagrams or block diagrams may represent a module, program segment, or a portion of code, which comprises one or more executable instructions for implementing the specified logical function(s). It should also be noted that, in some alternative implementations, the functions noted in the block may occur out of the order noted in the figures. For example, two blocks shown in succession may be executed substantially concurrently, or the blocks may sometimes be executed in the reverse order, depending upon the functionality involved. It may also be noted that each block of the block diagrams and/or flow diagrams, and their combinations, can be implemented by special purpose hardware-based systems that perform the specified functions or actions, or combinations of special purpose hardware and computer instructions.

The descriptions of the various embodiments of the present disclosure have been presented for purposes of illustration, but are not intended to be exhaustive or limited to the various embodiments disclosed. Many modifications and variations will be apparent to those of ordinary skill in the art without departing from the scope and spirit of the described embodiments. The terms used herein are chosen to best explain the principles of the embodiments, the practical application or technical improvement over technologies found in the marketplace, or to enable others of ordinary skill in the art to understand the embodiments disclosed herein.

What is claimed is:

1. A method for assigning a lock resource to a first object, comprising:
 a. obtaining a first alternative lock for the first object;
 b. determining first correlations between the first object and each of one or more other objects when the first alternative lock has been assigned to the one or more other objects;
 c. in response to determining that each of the first correlations is lower than a predetermined threshold, assigning the first alternative lock to the first object;
 d. in response to determining that any of the first correlations being higher than the predetermined threshold:
  i. obtaining a second alternative lock for the first object;
  ii. determining second correlations between the first object and each of the one or more other objects when the second alternative lock has been assigned to the one or more other objects; and
  iii. in response to determining that each of the second correlations being lower than the predetermined threshold, assigning the second alternative lock to the object; and
 e. in response to determining that any of the second correlations being higher than the predetermined threshold:
  i. calculating a first value of all of the first correlations as a first correlation value for the first alternative lock;
  ii. calculating a second value of all of the second correlations as a seccond correlation value for the second alternative lock; and
  iii. triggering the first alternative lock or the second alternative lock that has a larger one between the first correlation value and the second correlation value of the correlation values not to be assigned to the object.

2. The method according to claim 1, wherein a correlation between two objects is determined based on whether the two objects belong to one or more of the following consisting from a group of: a same clone group, a same RAID group, a same resource pool and a same deduplication domain.

3. The method according to claim 1, further comprising storing information of the lock resource assigned to the first object.

4. An apparatus for assigning a lock resource to a first object, comprising a processing unit configured to:
 a. obtaining a first alternative lock for the first object;
 b. determining first correlations between the first object and each of one or more other objects when the first alternative lock has been assigned to the one or more other objects;
 c. in response to determining that each of the first correlations is lower than a predetermined threshold, assigning the first alternative lock to the first object;
 d. in response to determining that any of the first correlations being higher than the predetermined threshold:
  i. obtaining a second alternative lock for the first object;
  ii. determining second correlations between the first object and each of the one or more other objects when the second alternative lock has been assigned to the one or more other objects; and
  iii. in response to determining that each of the second correlations being lower than the predetermined threshold, assigning the second alternative lock to the first object; and
 e. in response to determining that any of the second correlations being higher than the predetermined threshold:
  i. calculating a first value of all of the first correlations as a first correlation value for the first alternative lock;
  ii. calculating a second value of all of the second correlations as a second correlation value for the second alternative lock; and
  iii. triggering the first alternative lock or the second alternative lock that has a larger one between the first correlation value and the second correlation value of the correlation values not to be assigned to the object.

5. The apparatus according to claim 4, wherein a correlation between two objects is determined based on whether the two objects belong to one or more of the following consisting from a group of: a same clone group, a same RAID group, a same resource pool, and a same deduplication domain.

6. The apparatus according to claim 4, further configured to store information of the lock resource assigned to the object.

* * * * *